United States Patent
Ma et al.

(10) Patent No.: US 11,977,261 B2
(45) Date of Patent: May 7, 2024

(54) OPTICAL CONNECTOR ASSEMBLY

(71) Applicant: 3M INNOVATIVE PROPERTIES COMPANY, St. Paul, MN (US)

(72) Inventors: Changbao Ma, Austin, TX (US); Alexander W. Barr, Austin, TX (US); Daniel F. Cronch, Denver, CO (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 169 days.

(21) Appl. No.: 17/781,831

(22) PCT Filed: Nov. 30, 2020

(86) PCT No.: PCT/IB2020/061284
§ 371 (c)(1),
(2) Date: Jun. 2, 2022

(87) PCT Pub. No.: WO2021/111277
PCT Pub. Date: Jun. 10, 2021

(65) Prior Publication Data
US 2023/0003947 A1   Jan. 5, 2023

Related U.S. Application Data

(60) Provisional application No. 62/942,268, filed on Dec. 2, 2019.

(51) Int. Cl.
*G02B 6/38* (2006.01)
*G02B 6/36* (2006.01)
*G02B 6/42* (2006.01)

(52) U.S. Cl.
CPC ......... *G02B 6/3829* (2013.01); *G02B 6/3636* (2013.01); *G02B 6/3826* (2013.01);
(Continued)

(58) Field of Classification Search
CPC .... G02B 6/3829; G02B 6/383; G02B 6/3636; G02B 6/3826; G02B 6/4214; G02B 6/3885
See application file for complete search history.

(56) References Cited

U.S. PATENT DOCUMENTS 5,080,461 A * 1/1992 Pimpinella ........... G02B 6/3809
385/35
9,482,827 B2 * 11/2016 Haase ................... G02B 6/389
(Continued)

FOREIGN PATENT DOCUMENTS

JP   1164682 A   3/1999

OTHER PUBLICATIONS

International Search Report for PCT Application No. PCT/IB2020/061284 dated Feb. 9, 2021, 3 pages.

*Primary Examiner* — Ryan A Lepisto
*Assistant Examiner* — Erin D Chiem
(74) *Attorney, Agent, or Firm* — Jonathan L. Tolstedt

(57) ABSTRACT

An optical connector assembly includes first and second optical ferrules. Each of the first and second optical ferrules includes a front portion extending forwardly from a rear portion. The rear portion includes a top side and a bottom side. The bottom side of the rear portion defines a recessed portion. The first and second optical ferrules mate with each other such that the front portion of each of the first and second ferrules is disposed in the recessed portion of the other one of the first and second ferrules. Discrete retainers are assembled to opposite ends of the mated first and second ferrules. Each of the retainers defines a resilient portion resiliently forcing the front portion of one of the first and second mated ferrules against the other one of the first and second optical ferrules.

7 Claims, 7 Drawing Sheets

(52) U.S. Cl.
CPC ........... *G02B 6/383* (2013.01); *G02B 6/3885* (2013.01); *G02B 6/4214* (2013.01)

(56) References Cited

U.S. PATENT DOCUMENTS

| | | | |
|---|---|---|---|
| 10,162,140 B2 * | 12/2018 | Smith | G02B 6/4292 |
| 10,459,173 B2 * | 10/2019 | Haase | G02B 6/3885 |
| 10,514,512 B2 * | 12/2019 | Haase | G02B 6/3885 |
| 10,520,684 B2 * | 12/2019 | Haase | G02B 6/3882 |
| 10,649,153 B2 * | 5/2020 | Nelson | G02B 6/3893 |
| 10,746,942 B2 * | 8/2020 | Haase | G02B 6/383 |
| 2008/0193086 A1 | 8/2008 | Howard et al. | |
| 2012/0063725 A1 | 3/2012 | Meadowcroft et al. | |
| 2017/0168248 A1 | 6/2017 | Hayauchi et al. | |
| 2018/0128992 A1 | 5/2018 | Li et al. | |
| 2018/0275353 A1 | 9/2018 | Haase et al. | |

\* cited by examiner ure one or more optical fibers and one or more elements for optically coupling with one or more optical fibers of another optical ferrule, for example. A ferrule may have a unitary construction that includes both fiber attachment features, e.g., grooves or channels, and light redirecting features such as curved, e.g., spherical or aspherical, focusing mirrors or refracting lens surfaces, for example. As used herein, a unitary construction means that the ferrule is made as one piece so that the fiber attachment features and the light redirecting features have a predetermined arrangement with respect to one another. The ferrules described herein may be made from a wide variety of materials including glasses, ceramics, and polymers. In some embodiments, the ferrules described herein are injection molded polymeric ferrules.

OPTICAL CONNECTOR ASSEMBLY

CROSS REFERENCE TO RELATED APPLICATIONS

This application is a national stage filing under 35 U.S.C. 371 of PCT/IB2020/061284 filed Nov. 30, 2020, which claims the benefit of U.S. Application No. 62/942,268, filed Dec. 2, 2019, the disclosures of which are incorporated by reference in their entireties herein.

TECHNICAL FIELD

This disclosure relates generally to optical connector assemblies and optical ferrules.

BACKGROUND

Optical connectors can be used for optical communications in a variety of applications including telecommunications networks, local area networks, data center links, and internal links in computer devices. Optical communication can also be extended to applications inside smaller consumer electronic appliances such as laptops and cell phones. With the miniaturization of optical modules and optical fiber devices, optical fiber congestion can occur at optical interfaces and connection distribution points.

SUMMARY

Various aspects and embodiments described herein relate to optical connectors and optical ferrules.

Some aspects of the disclosure relate to an optical connector assembly including first and second optical ferrules. Each of the first and second optical ferrules includes a front portion extending forwardly from a rear portion. The rear portion includes a top side having an attachment portion for receiving and securing one or more optical waveguides. The top side further includes a light redirecting portion for changing a direction of light received from an optical waveguide received and secured in the attachment portion. The rear portion further includes a bottom side defining a recessed portion therein. The first and second optical ferrules are mated with each other such that the front portion of each of the first and second ferrules is disposed in the recessed portion of the other one of the first and second ferrules. First and second discrete retainers are assembled to opposite ends of the mated first and second ferrules. Each of the first and second discrete retainers defines a through opening for receiving the corresponding end of the mated first and second ferrules therein. Each of the first and second discrete retainers includes a resilient portion resiliently forcing the front portion of one of the first and second mated ferrules against the other one of the first and second optical ferrules.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows optical ferrules assembled with each other.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Optical connectors can be used to connect multi-fiber ribbon cables, for example. A ribbon cable typically includes a plurality of optical fibers organized and molded side by side in a plastic ribbon. An optical connector may include an optical ferrule configured to receive optical fibers from a ribbon cable. Two mating optical ferrules with the same fiber spacing may be placed in an abutting relationship so that the ends of the fibers of the respective ferrules are substantially co-axially aligned with one another, thereby forming a multi-fiber connection. Mating of optical ferrules can utilize constant forward and normal forces that can be directly or indirectly applied to the ferrules. The force can be applied anywhere on the ferrule, as long as it does not interfere with other requirements. Bending of the multi-fiber ribbons can be used to provide the desired forward and normal forces to keep the ferrules mated to each other. However, bending of the fibers may create stress over time in the fibers themselves and in the bonding between the fibers and the ferrule. In some embodiments of the present disclosure, optical ferrules and/or optical connectors include features that generate the desired forward and normal forces substantially without using bending of the optical fibers to produce the desired forces.

Optical connectors including expanded beam optical connectors may include optical ferrules (also known as "light coupling units") that may be formed as unitary, molded structures. A unitary optical ferrule is a single piece structure that includes one or more elements for receiving and securing a waveguide, one or more elements for affecting light from the waveguide, and one or more alignment features. Optical connectors described herein include one or more optical cable assemblies disposed in a housing. The optical cable assemblies may include one waveguide or arrays of multiple parallel waveguides (typically 4, 8 or 12 or more parallel waveguides) attached to one or more optical ferrules.

Figure 1:
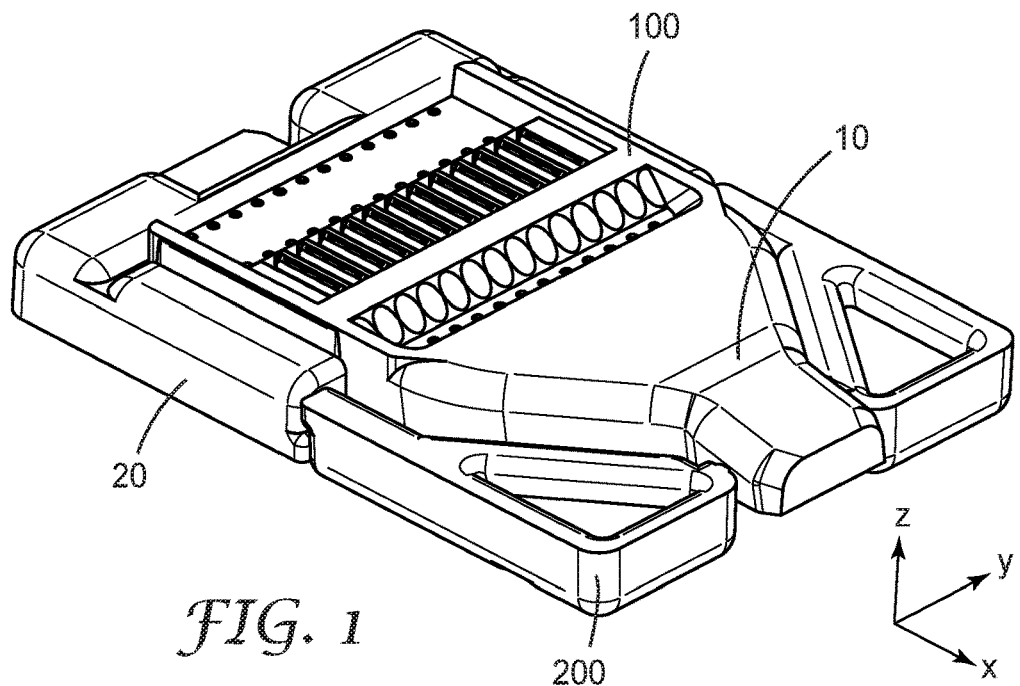
Figure 2:
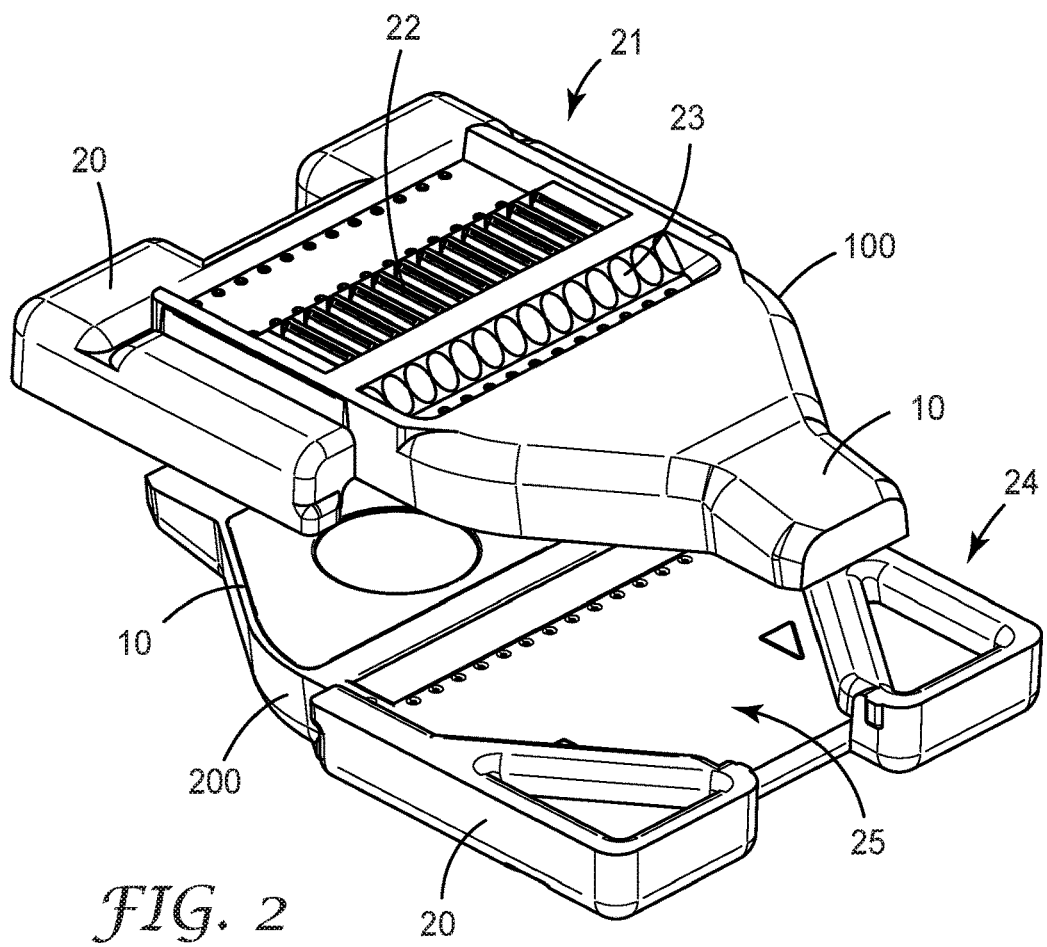
FIG. 2 schematically shows different features of the optical ferrules.
Figure 3:
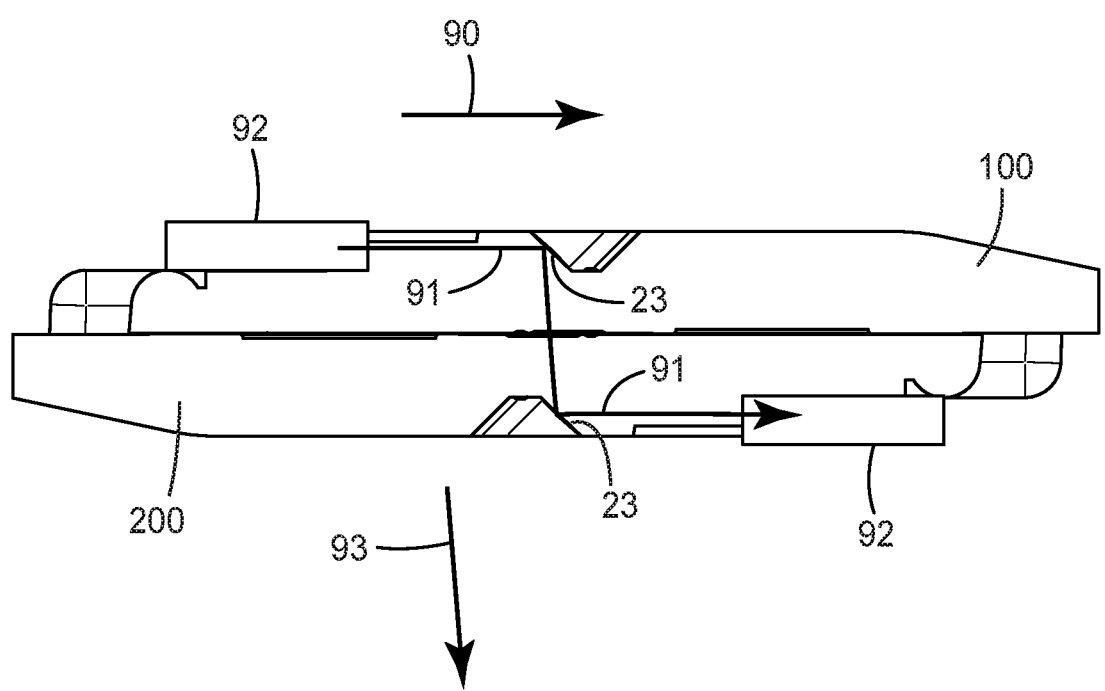
FIG. 3 schematically shows a cross sectional view of an optical ferrule mated with an optical mating ferrule according to certain aspects of the disclosure.
Figure 4:
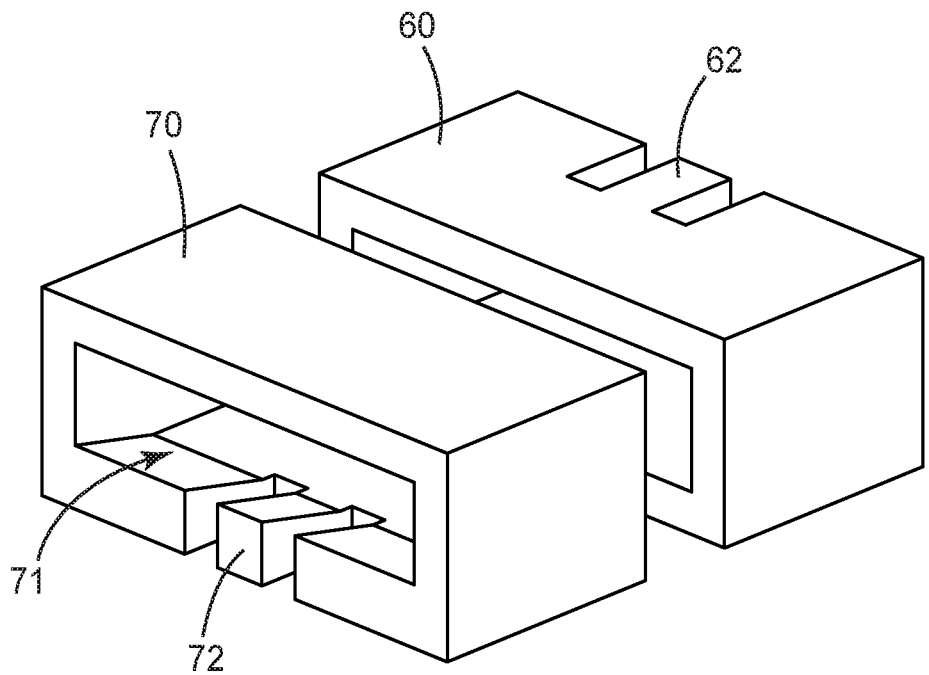
FIGS. 4 and 5 schematically show discrete retainers according to some embodiments of the disclosure.
Figure 5:
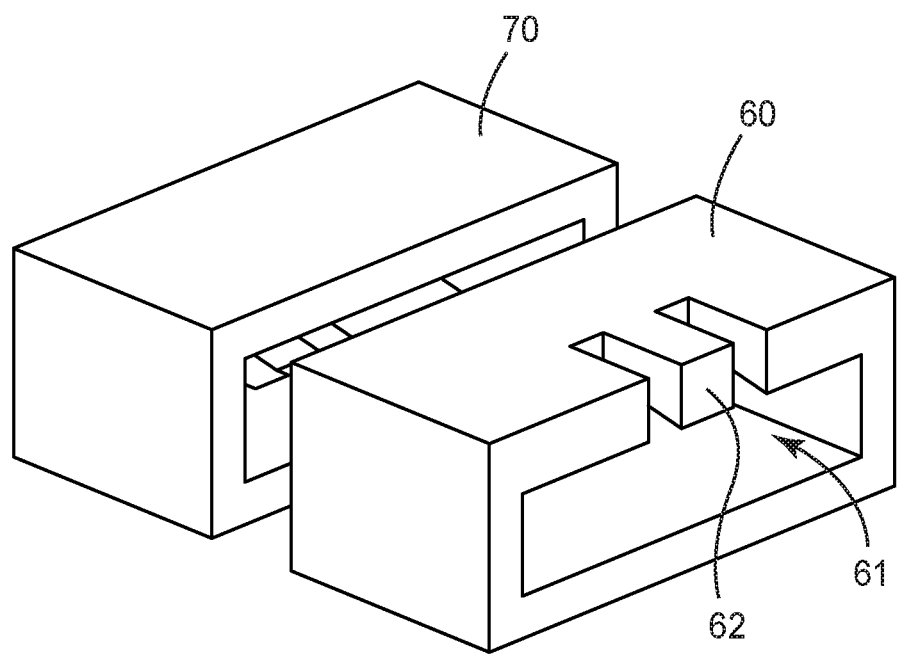
Figure 6:
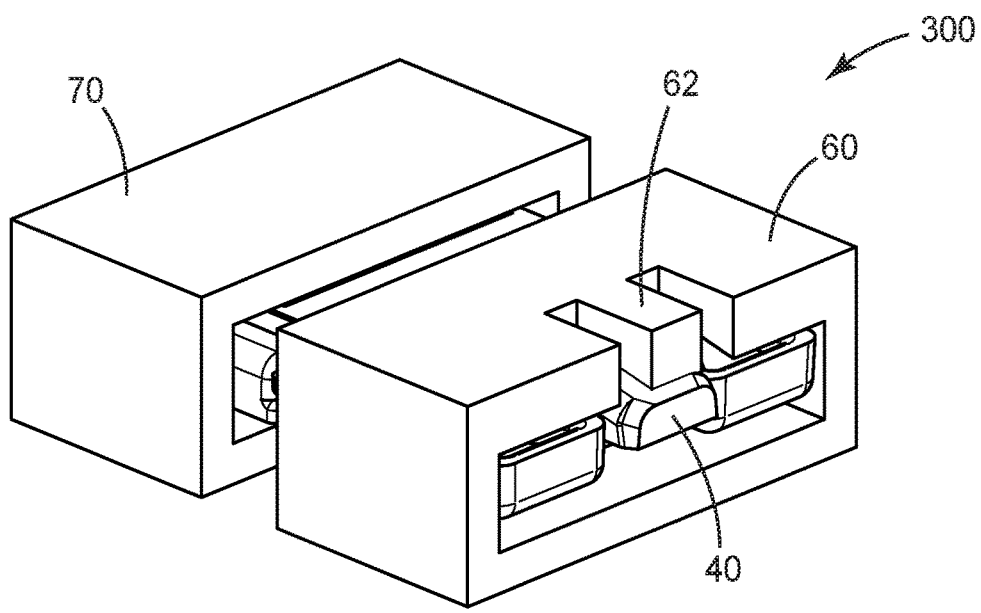
FIG. 6 schematically shows the optical ferrules assembled with discrete retainers according to some embodiments.
Figure 7:
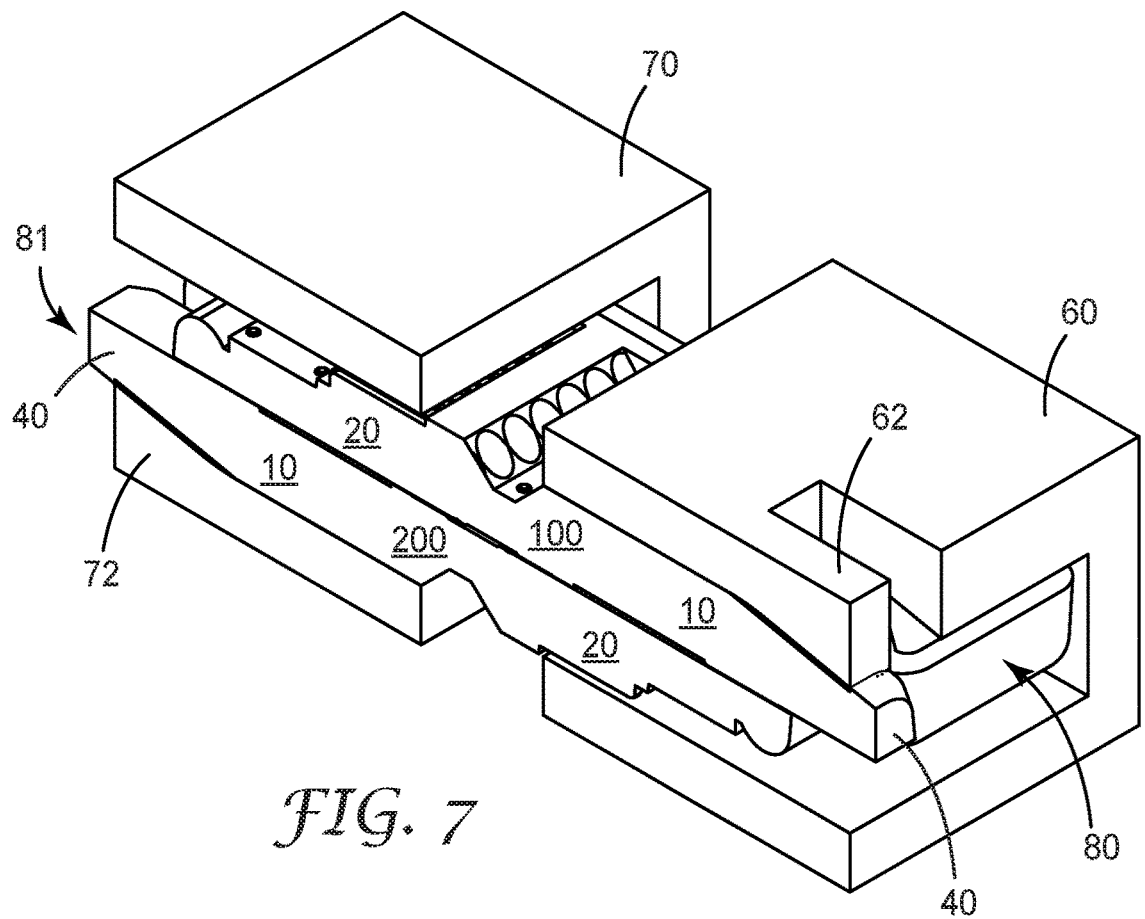
FIG. 7 schematically shows a cross section of the assembly of the retainers with the ferrules according to some embodiments.
Figure 8:
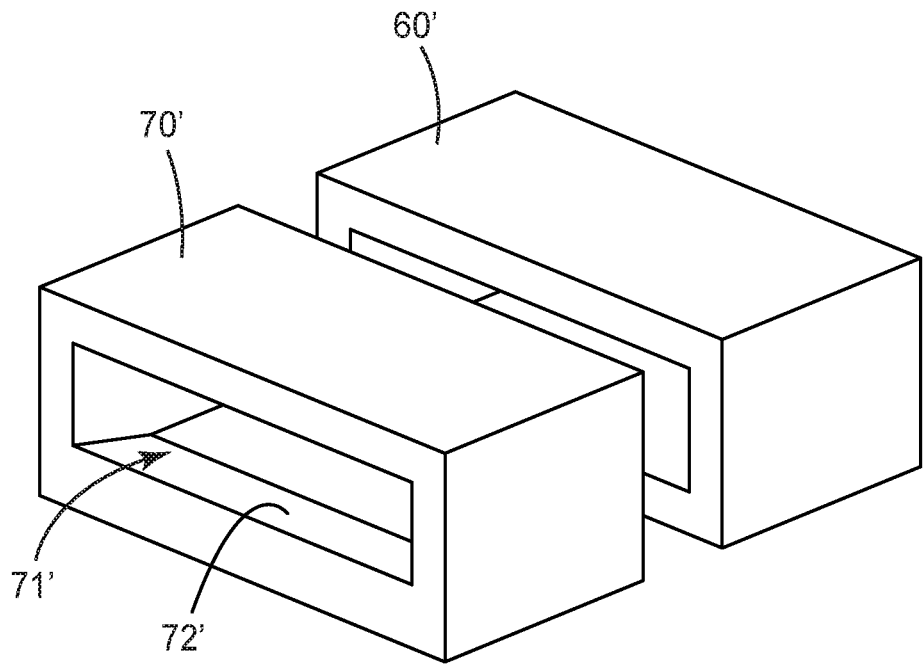
FIGS. 8-9 schematically show different views of discrete retainers according to some embodiments of the disclosure.
Figure 9:
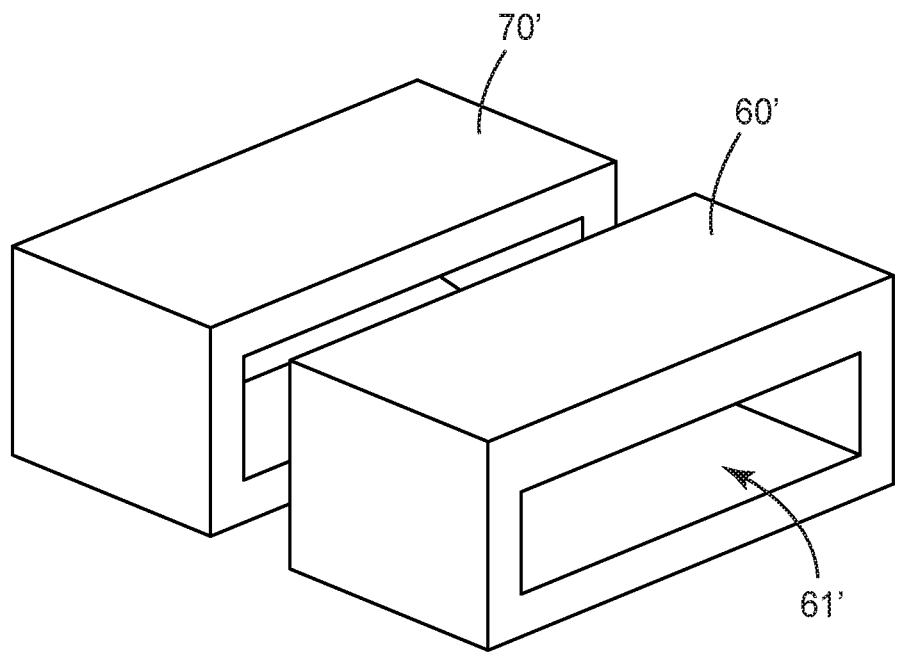
Figure 10:
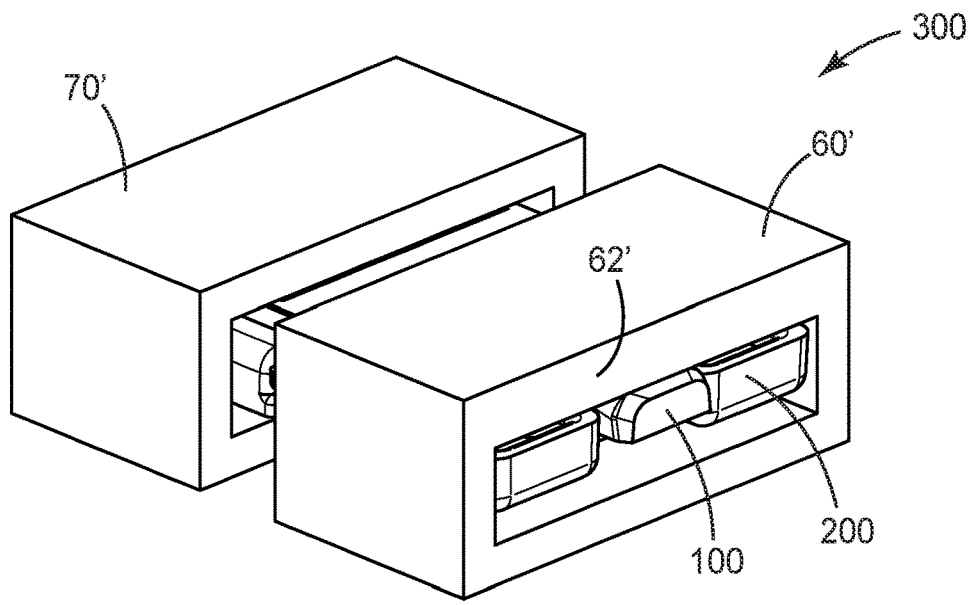
FIG. 10 schematically shows the optical ferrules assembled with discrete retainers according to some embodiments.

As illustrated in FIGS. 1 to 3, an optical connector assembly includes a first optical ferrule (100) for mating with a mating second optical ferrule (200) along a mating direction (90). The first and second optical ferrules (100, 200) are mated with each other such that the front portion (10) of each of the first (100) and second (200) ferrules is disposed in the recessed portion of the other one of the first and second ferrules In some aspects, the optical ferrules (100, 200) may have a unitary construction. In other aspects, the optical ferrule may be a ferrule that includes pieces formed separately and adhered or otherwise fastened together. The ferrule may be made from any suitable materials including polymers or ceramics. The ferrule may include one or more elements that guide or help guide the ferrule and a mating ferrule into alignment when the two ferrules are mated. In some aspects, either one of, or both, the first and second optical ferrules (100, 200) may be hermaphroditic.

In some embodiments, an optical connector may include a housing and the optical ferrules may be assembled to the housing. The housing may function to prevent dirt from interfering with optical connections, for example. The housing may provide, in some instances, retention force to maintain the ferrules in positive contact, as well as a latching and release mechanism for mating and de-mating an optical connector. In addition, the housing can protect an optical ferrule from outputting stray light that can be a safety hazard to those nearby. In some embodiments, the housing may have a latching mechanism to prevent its accidental opening. In some embodiments, the housing may have a door mechanism that may be opened by the action of mating two connectors. The housing can have any suitable configuration for holding and securing the optical ferrule and for mating the optical connector to the mating optical connector.

In some aspects, each of the first and second optical ferrules (100, 200) includes a front portion (10) extending forwardly from a rear portion (20). The rear portion (20) includes a top side (21) and a bottom side (24). The top side (21) includes an attachment portion (22) and a light redirecting portion (23), and the bottom side (24) defines a recessed portion (25). The first and second optical ferrules (100, 200) are mated with each other in a mating direction (90) such that the front portion (10) of each of the first (100) and second (200) ferrules is disposed in the recessed portion (25) of the other one of the first and second ferrules (100, 200). In some embodiments, a ferrule may have more than one mating direction. For example, in some embodiments the ferrule may be adapted to be moved along a first mating direction, or along a second orthogonal mating direction, or along a vector sum of the first and second mating directions relative to a mating ferrule in order to mate with the mating ferrule.

The attachment portion (22) on the top side (21) of the ferrules receives and secures one or more optical waveguides (92) as shown in FIG. 3. In some embodiments, the one or more optical waveguides (92) may form a waveguide array of an optical cable. The term optical waveguide is used herein to refer to an optical element that propagates signal light. An optical waveguide may have at least one core with a cladding, wherein the core and cladding are configured to propagate light, e.g., by total internal reflection. An optical waveguide may be, for example, a single or multi-mode waveguide, a single core optical fiber, a multi-core optical fiber, a polymeric waveguide, or planar waveguides disposed on a substrate. A waveguide may have any suitable cross sectional shape, e.g., circular, square, rectangular etc. The individual waveguides in the waveguide array may be optical fibers made of glass with a protective buffer coating. Multiple parallel waveguides of a waveguide array may be enclosed by a jacket.

The attachment portion (22), according to some aspects, may include one or more attachment areas for receiving and securing one or more optical waveguides (92). The attachment portion (22) extends along a first direction (x-axis) as shown in FIGS. 1 and 2. The optical waveguides (92) according to some embodiments may be optical fibers, and may be aligned in grooves provided in the attachment areas of the attachment portion (22) to which they are permanently attached. At the point of attachment, the fiber buffer coating and protective jacket (if any) of the waveguides (92) are stripped away to allow only the bare optical fibers to lie aligned and permanently affixed to the grooves in the attachment areas of the attachment portion (22).

The light redirecting portion (23) on the top side (21) of the ferrule changes a direction (90) of light (91) received from the optical waveguide (92) received and secured in the attachment portion (22). In some aspects, the light redirecting portion (23) may be configured to change the direction of light (91) received from the optical waveguide (92) received and secured in the attachment portion (22) by at least 45 degrees, or at least about 60 degrees. In some embodiments, the ferrules (100, 200) may each include an array of light redirecting elements in the light redirecting portion (23), at least one for each optical waveguide (92) in the waveguide array attached to respective ferrules. The exit ends of optical waveguides may be situated so as to be able to direct light (91) emanating from each optical waveguide into the input side or face of a corresponding light redirecting element in the light redirecting portion (23) of the ferrule (100, 200). For example, in various embodiments, each light redirecting element in the light redirecting portion (23) has one or more of a prism, a lens, and a reflecting surface, such as a mirror or the like, to collimate light.

In some embodiments, the light redirecting portion (23) changes the direction of light received from an optical waveguide received and secured in the attachment portion (22) from the mating (first) direction (90) of the optical ferrule to a different direction (93) as best seen in FIG. 3. The light (91) from the optical waveguide in the first ferrule (100), which is reflected by the light redirecting portion (23) of the first ferrule (100), is redirected to the light redirecting portion (23) of the second ferrule (200). The light redirecting portion (23) of the second ferrule (200) is oriented to focus the reflected light (91) into the optical waveguide (92) in the bottom ferrule (200). In some other aspects, the light redirecting portion may be configured to change the direction of the light (91) from the optical waveguide (92) received and secured in the attachment portion (22) primarily by total internal reflection (TIR). In some embodiments, the light redirecting elements in the light redirecting portion (23) may include a reflective coating, for example, or otherwise be made reflective.

The mating of the ferrules (100, 200) is maintained at a constant forward and normal force with respect to the ferrule. For instance, retainers may be assembled to the mated first and second ferrules to maintain the mating of the ferrules at substantially constant forward and normal force with respect to the ferrules. The retainers may be elastic members formed by any suitable material. In some aspects, discrete retainers may be provided at each end of the mated ferrules.

According to the different embodiments illustrated in FIGS. 4-12, the optical connector assembly (300) may include first (60; 60') and second (70; 70') discrete retainers assembled to opposite ends (80, 81) of the mated first and second ferrules (100, 200). The first discrete retainer (60; 60') defines a through opening (61; 61') for receiving a first end (80) of the mated first and second ferrules therein. The second discrete retainer (70; 70') defines a through opening (71; 71') for receiving a second end (81) opposite the first end (80) of the mated first and second ferrules. In some aspects, the first and second retainers may have the same flexing properties (e.g., the same modulus and the same geometry).

The first discrete retainer (60; 60') may include a resilient portion (62; 62') and the second discrete retainer (70; 70') may include a resilient portion (72; 72'). The resilient portion (62, 72; 62', 72') of each retainer (60, 70; 60', 70') resiliently forces the front portion (10) of one of the first and second mated ferrules against the other one of the first and second optical ferrules. In some aspects, the resilient portions (62, 72; 62', 72') resiliently force the front portion (10) of the corresponding mated ferrule against the other optical ferrule along a direction substantially orthogonal to a mating direction (90) of the first and second optical ferrules.

In the embodiments illustrated in FIGS. 4-7, the resilient portions (62, 72) of each of the first and second retainers may be a spring arm (62, 72) formed by a cut out of the retainers (60, 70). As can best be seen in FIG. 7, the resilient portion (62) of the first retainer (60) contacts the front portion (10) of the first ferrule (100) and the resilient portion (72) of the second retainer (70) contacts the front portion (10) of the second ferrule (200). The resilient portions (62, 72) of the retainers (60, 70) are formed to conform to the contour of the front portion (10) of the ferrules. For instance, at least a portion of the spring arm (62, 72) formed by the cut out of the retainer may be tapered to conform to a corresponding taper formed on the front portion (10) of the ferrule. In the embodiment illustrated in FIGS. 6 and 7, the front portion of one or both of the ferrules (100, 200) may include a nose region (40) and the taper may be formed on the nose region (40). The taper on the spring arm (62, 72) of the discrete retainers (60, 70) may be formed to conform to the tapered nose region (40) formed on the front portion (10) of the ferrules.

Figure 11:
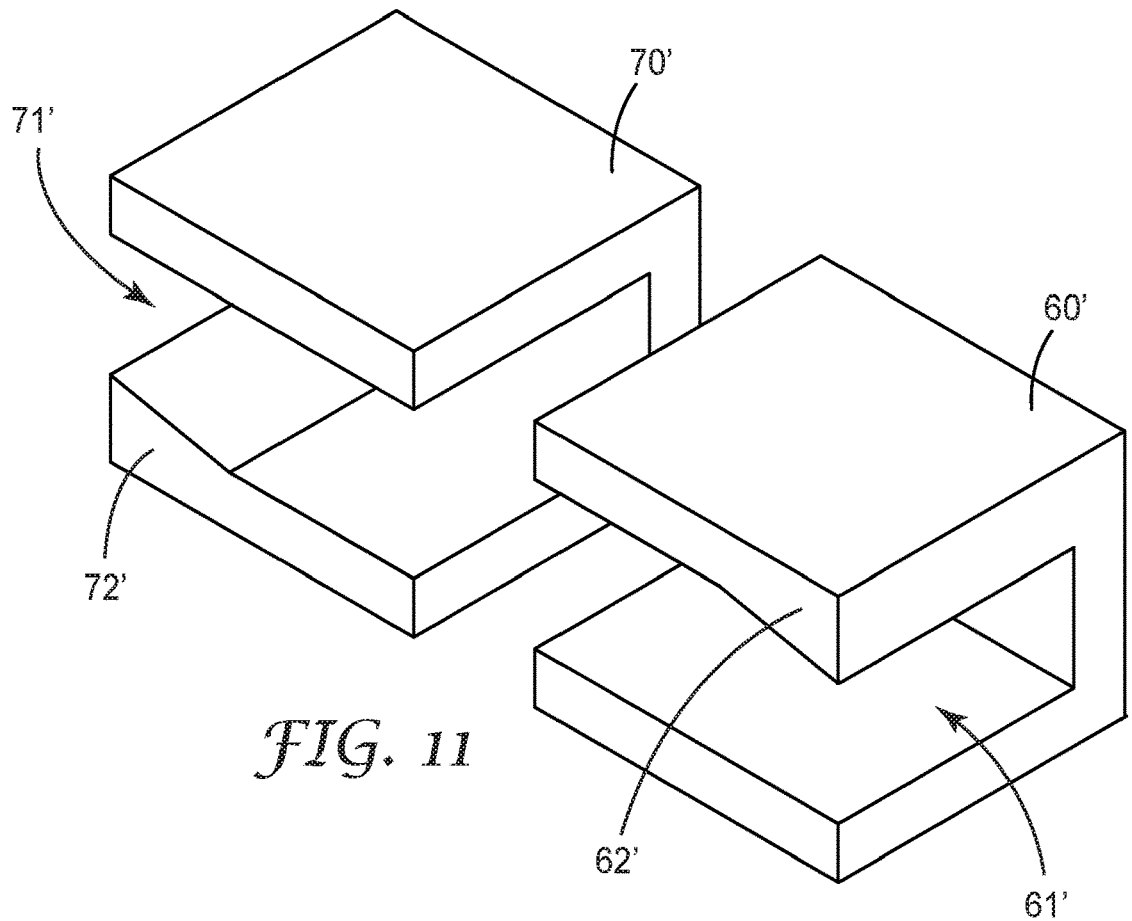
FIG. 11 schematically shows a cross section of the retainers according to some embodiments.
Figure 12:
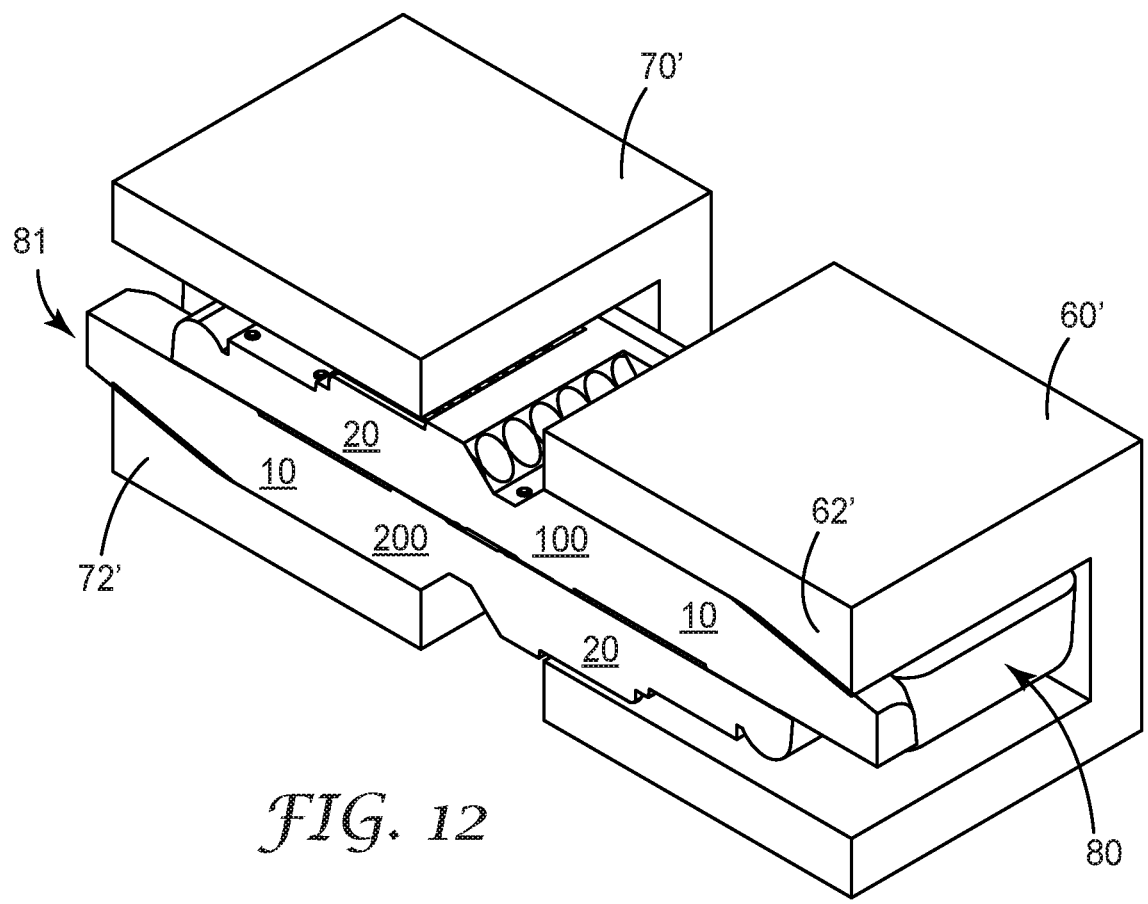
FIG. 12 schematically shows a cross section of the assembly of the retainers with the ferrules according to some embodiments.

In the embodiments illustrated in FIGS. 8-12, the resilient portion (62', 72') of each of the first and second retainers (60', 70') may be an inclined portion (62', 72') facing the through opening (61', 71') of the retainer, as best seen in FIG. 11. As illustrated in FIG. 12, the inclined portion (62') of the first retainer (60') contacts the front portion (10) of the first ferrule (100) and the inclined portion (72') of the second retainer (70') contacts the front portion (10) of the second ferrule (200). The inclined portions (62', 72') of the retainers (60', 70') are formed to conform to the contour of the front portion (10) of the ferrules. For instance, the inclined portion (62', 72') may be tapered to conform to a corresponding taper formed on the front portion (10) of the ferrule.

The inclined portions (62', 72') may be formed integrally with the retainers, or may be formed as a separate step during the manufacturing process.

The assembly of the discrete retainers at each end of the mated ferrules may be done sequentially. For instance, while one retainer is assembled at one end of the mated ferrules the other end of the mated ferrules may be temporarily clamped, say by hand or using a tool. Upon assembling the retainer at one end, the other retainer is assembled at the opposite end of the mated ferrules after removing the temporary clamping.

During assembly, the retainers are moved up to a point where the respective resilient portions (62, 72; 62', 72'), snugly conform to the front portions (10) of the respective ferrules (100, 200). Upon assembly, the resilient portion (62; 62') of the first discrete retainer (60; 60') resiliently forces the front portion (10) of the first ferrule (100) against the rear portion (20) of the second ferrule (200), and the resilient portion (72; 72') of the second discrete retainer (70; 70') resiliently forces the front portion (10) of the second ferrule (200) against the rear portion (20) of the first ferrule (100).

In some aspects, the retainers may have built-in guide pins and/or floats for assembly and mating of the retainers onto the ferrules. The pressing force to maintain the mating of the ferrules at a constant forward and normal force with respect to the ferrule may be generated entirely by the retainers (60, 60'; 70, 70'), or may include an additional external mechanism pressing the resilient portions (62, 72; 62', 72').

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical connector assembly comprising:
   first and second optical ferrules, each of the first and second optical ferrules comprising a front portion extending forwardly from a rear portion, the rear portion comprising:
   a top side comprising an attachment portion for receiving and securing one or more optical waveguides, and a light redirecting portion for changing a direction of light received from an optical waveguide received and secured in the attachment portion; and
   a bottom side defining a recessed portion therein;
   the first and second optical ferrules mated with each other such that the front portion of each of the first and second ferrules is disposed in the recessed portion of the other one of the first and second ferrules; and
   first and second discrete retainers assembled to opposite ends of the mated first and second ferrules, each of the first and second discrete retainers defining a through opening for receiving the corresponding end of the mated first and second ferrules therein and a resilient portion resiliently forcing the front portion of one of the first and second mated ferrules against the other one of the first and second optical ferrules.

2. The optical connector assembly of claim 1, wherein the resilient portion of each of the first and second retainers is a spring arm formed by a cut out of the retainer.

3. The optical connector assembly of claim 1, wherein the resilient portion of each of the first and second retainers is an inclined portion facing the through opening of the retainer.

4. The optical connector assembly of claim 1, wherein the light redirecting portion changes the direction of light received from an optical waveguide received and secured in the attachment portion from a mating direction of the optical ferrule to a different direction.

5. The optical connector assembly of claim 1, wherein the resilient portion of each of the first and second retainers contacts the front portion of a corresponding optical ferrule in the first and second optical ferrules.

6. The optical connector assembly of claim 1, wherein the first and second optical ferrules are hermaphroditic.

7. The optical connector assembly of claim 1, wherein the resilient portions resiliently force the front portion of the corresponding mated ferrule against the other optical ferrule along a direction substantially orthogonal to a mating direction of the first and second optical ferrules.

* * * * *